(12) United States Patent
Llagostera Forns

(10) Patent No.: US 8,042,596 B2
(45) Date of Patent: Oct. 25, 2011

(54) ARTICULATION DEVICE FOR AN AWNING ELBOW JOINT

(75) Inventor: Joan Llagostera Forns, Reus (ES)

(73) Assignee: Llaza, SA, Reus (Tarragona) (ES)

( * ) Notice: Subject to any disclaimer, the term of this patent is extended or adjusted under 35 U.S.C. 154(b) by 186 days.

(21) Appl. No.: 12/443,232

(22) PCT Filed: Sep. 24, 2007

(86) PCT No.: PCT/ES2007/000540
§ 371 (c)(1),
(2), (4) Date: Oct. 19, 2009

(87) PCT Pub. No.: WO2008/037826
PCT Pub. Date: Apr. 3, 2008

(65) Prior Publication Data
US 2010/0051208 A1 Mar. 4, 2010

(30) Foreign Application Priority Data
Sep. 27, 2006 (ES) ................. 200602108 U

(51) Int. Cl.
*E04F 10/06* (2006.01)
(52) U.S. Cl. ........................... 160/79; 160/70
(58) Field of Classification Search ............ 160/79, 160/70, 22, 66, 67; 135/88.11, 88.12
See application file for complete search history.

(56) References Cited

U.S. PATENT DOCUMENTS
1,815,199 A * 7/1931 Goldberg et al. ............... 403/73
7,367,376 B2 * 5/2008 Llagostera Forns ............ 160/66
7,451,797 B2 * 11/2008 Llagostera Forns ............ 160/79

FOREIGN PATENT DOCUMENTS
| ES | 8504352 | 7/1985 |
| ES | 1 051 839 | 10/2002 |
| ES | 2 191 843 | 9/2003 |
| FR | 2 794 781 | 12/2000 |
| WO | WO 2005/017278 A1 | 2/2005 |

OTHER PUBLICATIONS
International Search Report for PCT International Application No. PCT/ES2007/000540, mailed Jan. 30, 2008.

* cited by examiner

*Primary Examiner* — David Purol
(74) *Attorney, Agent, or Firm* — RatnerPrestia

(57) ABSTRACT

An articulation device applicable to an awning arm elbow includes a fork and a core which are joined to respective first and second semi-arms and are connected to one another by an articulation shaft. The core has an anchor in an outer surface for hooking an enlarged end of a flexible, elastically loaded tie rod which is accommodated in the first semi-arm. A seat with conical radial and axial support surfaces is formed in the core, and a circumferential channel is formed in the axial support surface. A bearing unit includes an annular element with a cylindrical outer radial rest surface to be fitted, by pressurized insertion with interference, into the conical radial support surface of the seat, and an axial rest surface to rest against the axial support surface of the seat.

11 Claims, 3 Drawing Sheets

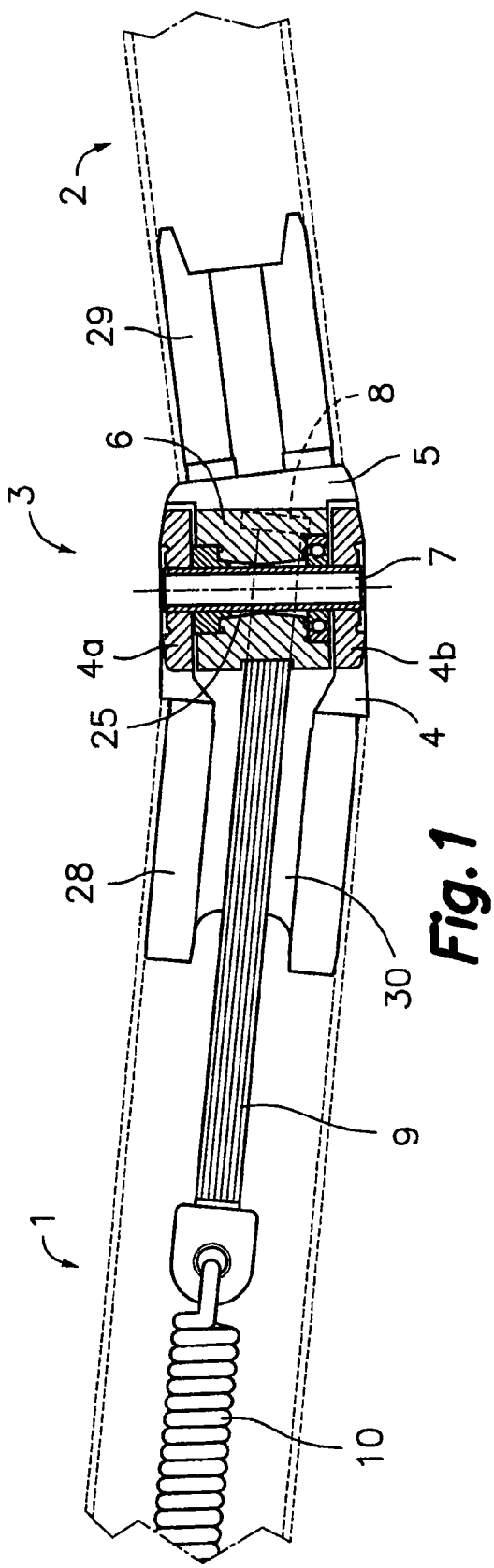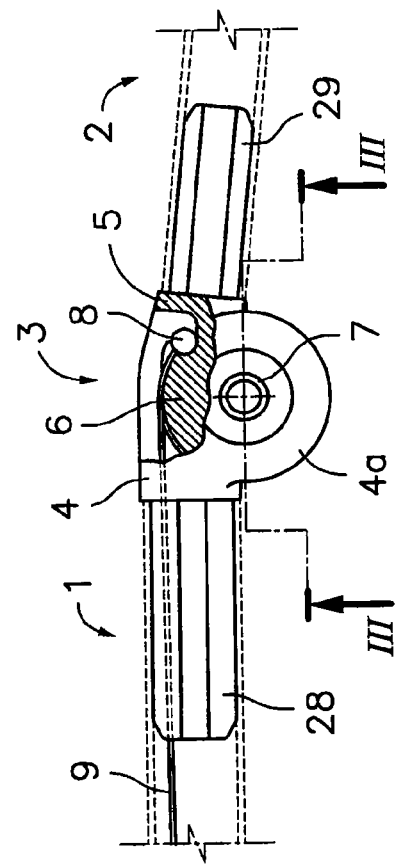

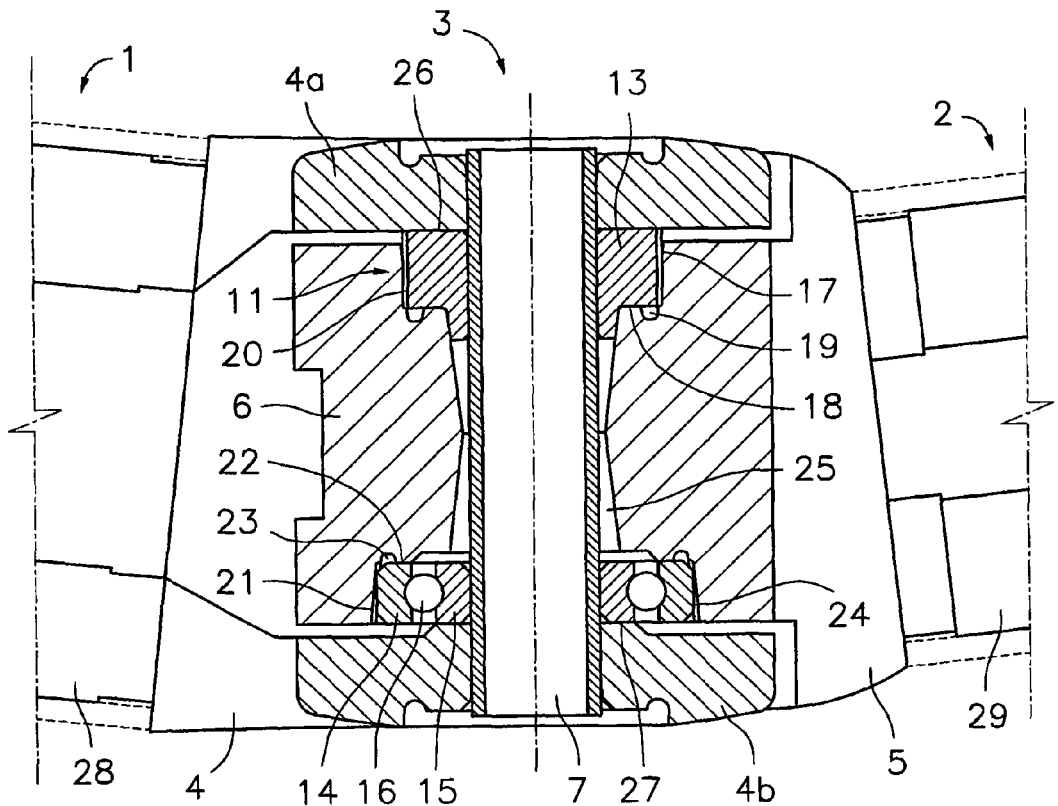
*Fig.3*
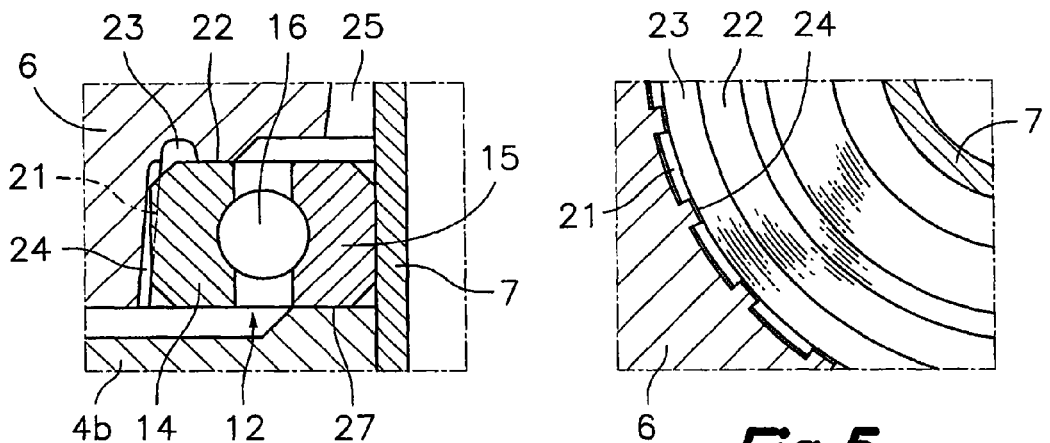
*Fig.4*     *Fig.5*

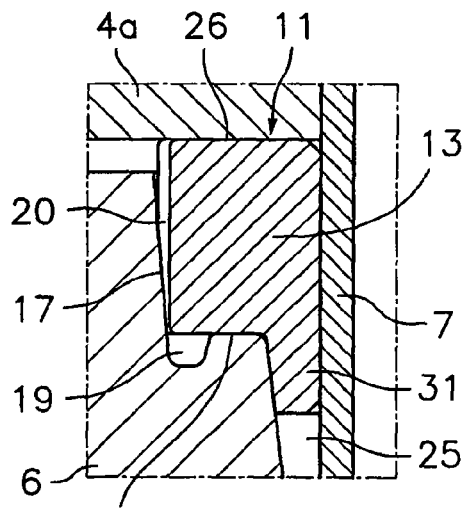
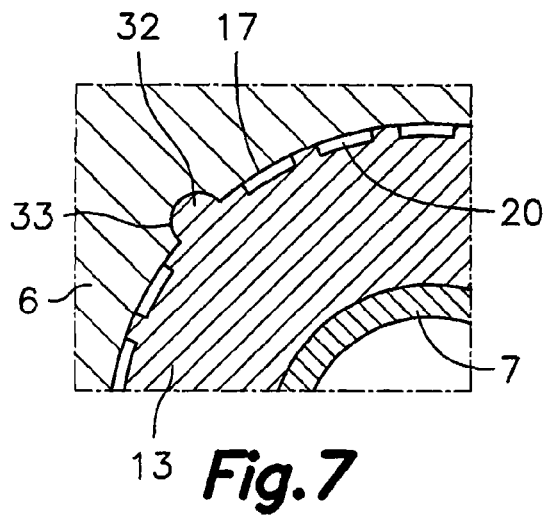
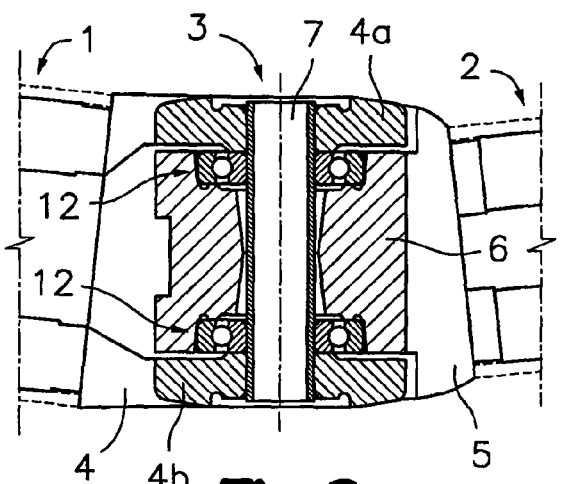
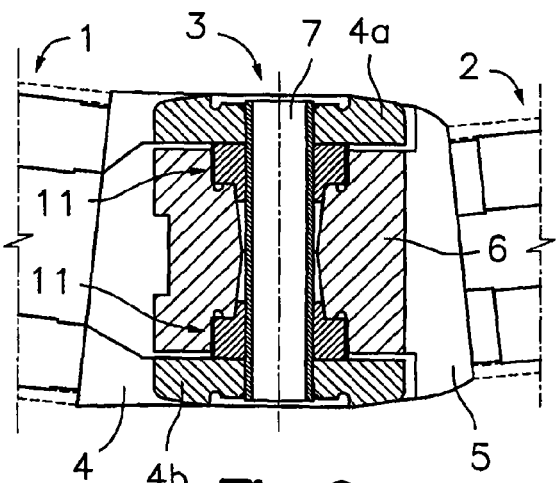

ARTICULATION DEVICE FOR AN AWNING ELBOW JOINT

This application is a U.S. National Phase Application of PCT International Application No. PCT/ES2007/000540, filed Sep. 24, 2007.

TECHNICAL FIELD

The present invention relates to an articulation device applicable to an awning arm elbow, said awning arm being of the type formed by two semi-arms articulated in said elbow, where the free end of the first semi-arm is provided with a configuration for articulated attachment to a fixed support adjacent to a winding tube for the canvas of the awning and the free end of the arm is provided with a configuration for articulated attachment to a load bar fixed to a front edge of the canvas, and where inside the first semi-arm there is arranged an elastic traction member connected to a flexible tie rod element having an end anchored in the mentioned articulation device for the elbow.

BACKGROUND OF THE INVENTION

Patent ES-A-2191843 discloses an articulated arm for an awning of the type described above, formed by a first semi-arm and a second semi-arm finished in respective first and second elbow parts articulated to one another by means of an articulation device to form an elbow. The first elbow part defines a fork between the branches of which a shaft is fixedly supported and the second elbow part defines a core located between the branches of the fork, and having an axial hole through which the mentioned shaft is inserted. In the core there is formed an anchoring configuration adapted to hook an enlarged end of the mentioned flexible tie rod element connected to said elastic traction member. In this type of arm, to guide a relative rotation between the first and second elbow parts around the shaft, and to support the second semi-arm on the first semi-arm in a cantilevered manner, it is usual for the articulation device to include bearing means formed by friction bushings, for example made of bronze or another sintered metal, each of which comprises a cylindrical section finished at one end by a perimetric flange.

Given that the elbow parts are generally obtained by the injection moulding of a lightweight metal alloy, such as for example, an aluminium alloy, many of the configurations that they comprise, such as holes for shafts, seats for friction bushings, etc., have a conical shape necessary to facilitate the demoulding during the manufacturing process. This imposes machining some of the mentioned configurations, such as the seats for the friction bushings, for the purpose of offering a uniform and secure support for them. The operations for machining the elbow parts are carried out after the injection moulding and after a step of painting or lacquering the parts, and are difficult and economically expensive. Furthermore, friction bushings withstand limited axial and radial stresses compared to roll bearings, which limits the extension that the second semi-arm may have to be supported in a cantilevered manner by the articulation configuration with respect to the end of the first semi-arm.

DISCLOSURE OF THE INVENTION

The present invention contributes to overcoming the previous and other drawbacks by providing an articulation device applicable to an awning arm elbow, of the type comprising a first elbow part fixed to an end of a first semi-arm and a second elbow part fixed to an end of a second semi-arm. The first elbow part defines a fork between the branches of which a shaft is supported and the second elbow part defines a core adapted to be arranged between the branches of said fork and provided with an axial through hole into which the mentioned shaft is inserted. In an outer surface of the core there is formed an anchoring configuration for hooking an enlarged end of a flexible tie rod element connected to an elastic member accommodated inside said first semi-arm. Between the core and the shaft, in the mouths of said axial hole, there are arranged bearing means to guide a relative rotation between said first and second elbow parts around the shaft and to support one of the first or second semi-arms at the end of the other. The articulation device of the present invention is characterized in that said bearing means include at least one bearing unit comprising at least one annular element fixed in a seat formed in the core, in one of the mouths of the axial hole. The mentioned seat comprises a conical radial support surface coaxial with the shaft, an axial support surface perpendicular to the shaft, and a circumferential channel formed in said axial support surface adjacent to said radial support surface. The annular element of the bearing unit comprises a cylindrical outer radial rest surface adapted to be fitted, by means of pressurized insertion with interference, into said conical radial support surface of the seat, and an axial rest surface adapted to rest against said axial support surface of the seat.

In one embodiment, the bearing unit is a roll bearing, preferably of a commercially available type, which has the radial rest surface in the form of a continuous cylindrical surface formed in the outer annular element, and the radial support surface of the seat is a discontinuous conical surface provided by the edges of ribs projecting from a surrounding surface defined in the seat. The roll bearing can be of several types, including ball bearings, needle bearings, cylindrical or tapered roller bearings, etc. In another embodiment, the bearing unit is a friction bushing formed by a single annular element defining the mentioned radial rest surface in the form of a discontinuous cylindrical surface provided by the edges of ribs projecting from an outer surface thereof, whereas the radial support surface of the seat is a continuous conical surface. The friction bushing of the present invention is specifically designed and produced for this application and can be, for example, made of bronze.

In both embodiments, the entire second elbow part, including the surfaces of the seat, is coated with a layer of paint or lacquer. Given that the material of the annular element of the bearing, typically steel, is harder than the aluminium alloy of which the second elbow part is made and that the layer of paint or lacquer coating the seat, during the operation for installing the roll bearing in the seat by means of pressurized insertion with interference, the annular element of the roll bearing will penetrate the conical seat in a perfectly centred manner, sweeping some of the layer of coating and/or of the material of the seat towards the bottom, i.e., towards the axial support surface of the seat and will be deposited and retained inside the circumferential channel formed therein for the purpose not getting in the way between the axial rest surface of the bearing and the axial support surface of the seat when the bearing reaches its limit position.

Something similar occurs in the case of the friction bushing, although here it is also possible for both the material of the ribs forming the cylindrical radial rest surface of the bushing and the material and coating of the continuous conical radial support surface of the seat to be partially deformed. The material swept during the operation for installing the friction bushing in the seat by means of pressurized insertion with interference will be likewise deposited and retained inside the circumferential channel of the seat.

An articulation device with two roll bearings at the ends of the axial hole of the core installed according to the present invention can allow the second semi-arm to be longer than in the comparable articulated arms of the state of the art by virtue of the larger allowable axial and radial forces. Furthermore, the installation of the roll bearings according to the present invention is more cost-effective than a hypothetical installation of roll bearings with prior machining of the seats. An articulation device with two friction bushings at the ends of the axial hole of the core installed according to the present invention can be more cost-effective than in the comparable articulated arms of the state of the art due to the absence of machining in the seats. The possibility of an articulation device according to the present invention combining a friction bushing at one end of the axial hole of the core and a bearing at the opposite end is also provided.

BRIEF DESCRIPTION OF THE DRAWINGS

The previous and other features and advantages will be more fully understood from the following detailed description of several embodiments with reference to the attached drawings, in which:

FIG. 1 is a side sectioned view of the articulation device of the present invention applied to an articulated awning arm elbow;

FIG. 2 is a partially sectioned upper view of the articulation device of FIG. 1;

FIG. 3 is a cross-sectional view taken through the plane indicated by line III-III of FIG. 2, showing a first embodiment including a roll bearing at the lower part of FIG. 3 and a second embodiment including a friction bushing at the upper part of FIG. 3;

FIG. 4 is an enlarged cross-sectional view of a detail of FIG. 3, showing the installation of the roll bearing of the first embodiment;

FIG. 5 is an enlarged lower cross-sectional view of the seat without the roll bearing taken through a horizontal plane perpendicular to the plane of FIG. 4;

FIG. 6 is an enlarged cross-sectional view of another detail of FIG. 3, showing the installation of the friction bushing of the second embodiment;

FIG. 7 is an enlarged cross-sectional view of the seat and the friction bushing taken through a horizontal plane perpendicular to the plane of FIG. 6;

FIG. 8 is a variant of the articulation device of FIG. 3 with two roll bearings installed according to the first embodiment; and FIG. 9 is another variant of the articulation device of FIG. 3 with two friction bushings installed according to the second embodiment.

DETAILED DESCRIPTION OF EXEMPLARY EMBODIMENTS

Referring first to FIGS. 1 and 2, there is shown an articulation device according to the present invention, which is applicable to an articulated awning arm elbow 3 of the type comprising a first elbow part 4 fixed to an end of a first semi-arm 1 and a second elbow part 5 fixed to an end of a second semi-arm 2. The bodies of the first and second semi-arms 1, 2, shown by means of dotted lines in FIGS. 1 and 2, are typically formed by extruded tubular sections made of an aluminium alloy, and the first and second elbow parts 4, 5 comprise respective coupling configurations 28, 29 adapted to be coupled by plugging into the ends of said tubular sections. The first elbow part 4 defines a fork having two branches 4a, 4b between which a shaft 7 is supported, said shaft 7 being formed, for example, by a cylindrical steel tube portion. The second elbow part 5 defines a core 6 configured to be arranged between the mentioned branches 4a, 4b of said fork. The core 6 includes an axial through hole 25 into which the shaft 7 is inserted, such that the first and second elbow parts 4, 5 can rotate with respect to one another around the shaft 7. In a manner known in itself, in an outer surface of the core 6 there is formed an anchoring configuration for hooking an enlarged end 8 of a flexible tie rod element 9 connected to an elastic member 10 (FIG. 1), such as, for example, a helical spring under traction, accommodated inside said first semi-arm 1. The flexible tie rod element 9 passes into the first semi-arm 1 through a passage 30 provided in the coupling configuration 28 of the first elbow part 4. To guide the relative rotation between the first elbow part 4 and the second elbow part 5 around the shaft 7, and also to support one of the first or second semi-arms 1, 2 at the end of the other in a cantilevered manner, bearing means are arranged in the mouths of said axial hole 25, between the core 6 and the shaft 7.

The mentioned bearing means, best shown in FIG. 3, preferably include two bearing units 11, 12 located in the mouths of the axial through hole 25 of the core 6, although a single bearing unit is not discarded if it is correctly sized. FIG. 3 shows a variant of the articulation device comprising a roll bearing 12 in the lower mouth of the axial hole 25 of the core 6 installed according to a first embodiment of the present invention and a friction bushing 11 in the upper mouth of the axial hole 25 of the core 6 installed according to a second embodiment of the invention. It will be observed in FIG. 3 that the axial through hole 25 of the core 6 has a double conical configuration, with the larger sections at the ends thereof. This is so due to the fact that the first and second elbow parts 4, 5 are obtained by the injection moulding of a lightweight metal alloy, typically an aluminium alloy, and many of their configurations need to have a conical configuration to facilitate the demoulding during their manufacturing process. This conical configuration also affects the seats for the bearing units 11, 12, as will be seen below.

The first embodiment is described below in relation to FIGS. 3, 4 and 5. Said first embodiment includes a roll bearing 12, which is of a conventional type, for example, a single-row rigid ball bearing, preferably of stainless steel and sealed or provided with side protections, capable of withstanding radial and axial stresses. The roll bearing 12 basically comprises an outer annular element 14 and an inner annular element 15 providing respective outer and inner roll tracks on which a plurality of rolling elements 16 roll. In the core 6 of the articulation device, next to the mouth of the axial hole 25, there is formed a seat adapted to accommodate the mentioned outer annular element 14, whereas the shaft 7 provides a radial support surface adapted to support an inner radial rest surface of the inner annular element 15 and the corresponding branch 4b of the fork has an axial support surface 27 adapted to make contact with an axial rest surface of the inner annular element 15 of the roll bearing. The inner annular element 15 is thus fixedly joined to the shaft 7, which is in turn fixedly joined to the branches 4a, 4b of the fork forming part of the first elbow part 4, and the outer annular element 14 is fixedly joined to the core 6 forming part of the second elbow part 5.

FIGS. 4 and 5 show in detail the installation of the outer annular element 14 of the roll bearing 12 in the corresponding seat of the core 6, according to the first embodiment of the present invention. This seat comprises a conical radial support surface 21, coaxial with the shaft 7, and an axial support surface 22, perpendicular to the shaft 7. A circumferential channel 23 is formed in said axial support surface 22, in a position adjacent to said conical radial support surface 21. The mentioned outer radial rest surface of the outer annular element 14 is in the form of a continuous cylindrical surface, whereas the conical radial support surface 21 of the seat is in the form of a discontinuous conical surface due to grooves 24 formed therein. The mentioned grooves 24 extend in the directrix directions and the width of the portions of the discontinuous conical radial support surface 21 is generally less than the width of the grooves 24. The cylindrical outer radial rest surface of the annular element 14 of the roll bearing 12 is thus adapted to be fitted, by means of pressurized insertion with interference, into said discontinuous conical radial support surface 21 of the seat. The possible material of the portions of the discontinuous conical radial support surface 21, or of its coating, pulled off by the annular element 14 of the roll bearing 12 during the insertion operation is accommodated and retained in the circumferential channel 23. FIG. 4 shows the contour of the conical radial support surface 21 prior to the deformation by means of a dotted line.

The degree of conicity of the conical radial support surface 21 of the seat is the suitable one for allowing the demoulding of the core 6 in a process for obtaining the core 6 by injection moulding. Therefore, the roll bearing 12 can be installed in perfect conditions in the seat of the core 6 as it comes out of the mould, and even after having been coated with a layer of paint or lacquer, without the need of machining the seat.

The installation of the friction bushing 11 according to the second embodiment of the present invention is described in detail below in relation to FIGS. 6 and 7. As in the first embodiment, the seat comprises a conical radial support surface 17 coaxial with the shaft 7, an axial support surface 18 perpendicular to the shaft 7, and a circumferential channel 19 formed in said axial support surface 18 in a position adjacent to said conical radial support surface 17. The friction bushing 11 is formed by a single annular element 13, which can be, for example, made of bronze. The annular element 13 comprises an outer radial rest surface in the form of a discontinuous cylindrical surface, defined between grooves 20 formed in the directrix directions in a cylindrical outer surface of the annular element 13. In this embodiment, the conical radial support surface 17 of the seat is in the form of a continuous conical surface. The degree of conicity of the conical radial support surface 17 of the seat is adapted to allow the demoulding of the core 6 in a process for obtaining the core 6 by injection moulding. The discontinuous cylindrical outer radial rest surface of the annular element 13 of the friction bushing 11 is adapted to be fitted, by means of pressurized insertion with interference, into said continuous conical radial support surface 17 of the seat. In this case, it is probable that both the material of the annular element 13 and the material or coating of the seat will be deformed or partially pulled off during the insertion operation, and the resulting chips are accommodated and retained in the circumferential channel 19.

In this second embodiment, the single annular element 13 of the friction bushing 11 is fixedly joined to the core 6, which forms part of the second elbow part 5. The shaft 7 provides a radial support surface adapted to slidingly support an inner radial rest surface defined by said annular element 13 of the friction bushing 11 and the corresponding branch 4a of the fork provides an axial support surface 26 adapted to make sliding contact with an axial rest surface defined by the annular element 13 of the friction bushing 11. The shaft 7 is fixedly joined to the branches 4a, 4b of the fork, which forms part of the first elbow part 4. The annular element 13 of the friction bushing 11 optionally has an extension 31 defining a conical outer surface adapted to be fitted by plugging into the conical inner surface of the axial hole 25 of the core 6. Furthermore, to prevent a relative rotation between the annular element 13 of the friction bushing 11 and the core 6, the annular element 13 has formed thereon a projecting configuration 32 adapted to be fitted into a corresponding recess configuration 33 of the core, as shown in FIG. 7.

FIG. 8 illustrates a variant of the articulation device of the present invention in which both bearing units are roll bearings 12 installed in the mouths of the axial hole 25 of the core 6, as has been described above in relation to FIGS. 4 and 5 according to the first embodiment. This construction provides a high-precision articulation with a very low friction torque, which allows the tension of the elastic member 10 to be transmitted more integrally to the core 6 and the semi-arm supported in a cantilevered manner to be longer.

FIG. 9 illustrates another variant of the articulation device of the present invention in which both bearing units are friction bushings 11 installed in the mouths of the axial hole 25 of the core 6, as has been described above in relation to FIGS. 6 and 7 according to the second embodiment. This construction provides an articulation with a precision and friction torque suitable for most applications at a lower cost compared to devices in which the seats for the bearing units are machined.

The mixed composition described above in relation to FIG. 3 provides an articulation device with features which are a combination of those mentioned above in relation to FIGS. 8 and 9. It is recommendable here to place the roll bearing 12 in the position with most mechanical stress, which is usually the lower position.

A person skilled in the art will be able to make modifications and variations to the embodiments shown and described without departing from the scope of the present invention as it is defined in the attached claims.

The invention claimed is:

1. An articulation device applicable to an awning arm elbow, of the type comprising:
    a first elbow part fixed to an end of a first semi-arm, said first elbow part defining a fork having branches between which a shaft is supported;
    a second elbow part fixed to an end of a second semi-arm, said second elbow part defining a core adapted to be arranged between the branches of said fork and provided with an axial hole into which said shaft is inserted, an anchoring configuration being formed in an outer surface of said core for hooking an enlarged end of a flexible tie rod element connected to an elastic member accommodated inside said first semi-arm; and
    bearing means arranged between the core and the shaft in the mouths of said axial hole to guide a relative rotation between said first elbow part and said second elbow part around said shaft and to support one of the first or second semi-arms on the other;
    wherein said bearing means include at least one bearing unit comprising at least one annular element fixed in a seat formed in the core in one of the mouths of the axial hole, wherein said seat comprises a conical radial support surface coaxial with the shaft, an axial support surface perpendicular to the shaft, and a circumferential channel formed in said axial support surface adjacent to said conical radial support surface, and wherein said annular element of the bearing unit comprises a cylindrical outer radial rest surface, adapted to be fitted, by pressurized insertion with interference, into said conical radial support surface of the seat, and an axial rest surface adapted to rest against said axial support surface of the seat.

2. The device according to claim 1, wherein the conical radial support surface of the seat has a degree of conicity adapted to allow the demoulding of the core in a process for obtaining the core by injection moulding.

3. The device according to claim 2, wherein the bearing unit is a roll bearing comprising an outer annular element and an inner annular element defining outer and inner roll tracks, respectively, between which there are arranged a plurality of rolling elements to roll thereon, and wherein said outer annular element defines the outer radial rest surface in the form of a continuous cylindrical surface, and in that the conical radial support surface of the seat is in the form of a discontinuous conical surface defined between grooves formed therein.

4. The device according to claim 3, wherein the shaft provides a radial support surface adapted to support an inner radial rest surface defined by said inner annular element of the roll bearing.

5. The device according to claim 4, wherein a branch of the fork provides an axial support surface adapted to make contact with an axial rest surface defined by said inner annular element of the roll bearing.

6. The device according to claim 3, wherein said grooves are arranged in directrix directions and the width of the portions of the discontinuous conical radial support surface is less than the width of the grooves.

7. The device according to claim 2, wherein the bearing unit is a friction bushing formed by a single annular element in which the outer radial rest surface is in the form of a discontinuous cylindrical surface defined by grooves formed in a cylindrical outer surface of the annular element, and in that the conical radial support surface of the seat is in the form of a continuous conical surface.

8. The device according to claim 7, wherein the shaft provides a radial support surface adapted to slidingly support an inner radial rest surface defined by said annular element of the friction bushing.

9. The device according to claim 8, wherein a branch of the fork provides an axial support surface adapted to make sliding contact with an axial rest surface defined by the annular element of the friction bushing.

10. The device according to claim 7, wherein said grooves are arranged in directrix directions and the width of the portions of the discontinuous cylindrical radial support surface is less than the width of the grooves.

11. The device according to claim 7, wherein the annular element of the friction bushing has formed thereon a projecting configuration adapted to be fitted into a corresponding recess configuration of the core, to prevent a relative rotation between the annular element and the core.

* * * * *